(12) United States Patent
Singh

(10) Patent No.: US 7,011,289 B2
(45) Date of Patent: Mar. 14, 2006

(54) VALVE

(76) Inventor: Mangat Tripet Singh, 245 Johnson Ave., Los Gatos, CA (US) 95030

( * ) Notice: Subject to any disclaimer, the term of this patent is extended or adjusted under 35 U.S.C. 154(b) by 272 days.

(21) Appl. No.: 10/450,973

(22) PCT Filed: Dec. 18, 2001

(86) PCT No.: PCT/GB01/05590

§ 371 (c)(1), (2), (4) Date: Nov. 5, 2003

(87) PCT Pub. No.: WO02/50461

PCT Pub. Date: Jun. 27, 2002

(65) Prior Publication Data

US 2004/0099308 A1 May 27, 2004

(30) Foreign Application Priority Data

Dec. 18, 2000 (GB) .................................. 0030821

(51) Int. Cl.
*F16K 31/12* (2006.01)

(52) U.S. Cl. ........................ 251/31; 251/30.01; 251/32; 251/57

(58) Field of Classification Search ................ 137/106, 137/625.25, 625.67; 251/31, 57, 32, 89, 251/90, 30.01
See application file for complete search history.

(56) References Cited

U.S. PATENT DOCUMENTS

| | | | |
|---|---|---|---|
| 2,593,039 A * | 4/1952 | Livers et al. | ................. 91/516 |
| 3,630,027 A | 12/1971 | Lambert | |
| 3,648,967 A | 3/1972 | O'Neill et al. | |
| 3,790,125 A | 2/1974 | Swatty | |
| 3,951,162 A * | 4/1976 | Wilke | ......................... 137/106 |
| 4,513,653 A * | 4/1985 | Varlemann | ................... 91/239 |
| 4,580,590 A | 4/1986 | Brinkel et al. | |
| 4,800,922 A | 1/1989 | Bratland | |
| 5,135,020 A | 8/1992 | Rausch | |

FOREIGN PATENT DOCUMENTS

| | | |
|---|---|---|
| DE | 2422593 | 11/1975 |
| GB | 1435710 | 5/1976 |
| GB | 1476173 | 6/1977 |
| GB | 2121514 A | 12/1983 |

* cited by examiner

*Primary Examiner*—Frederick Nicolas
*Assistant Examiner*—Craig Schneider

(57) ABSTRACT

A sliding spool valve (1) is provided for controlling flow of fluid especially between an inlet (2) at a relatively high pressure and an outlet (6) at a relatively low pressure. Wherein the spool valve is reciprocally displaced between open and closed positions by hydraulic action of the transmitted fluid.

15 Claims, 3 Drawing Sheets

VALVE

This invention relates to a valve for use in controlling the flow of a transmitted fluid and in particular to a valve that is actuated between open and closed positions using the pressure of transmission of the fluid that the valve controls.

Actuated valves are well known, but their actuators are usually driven by an external independent energy source which is either electric, in the case of solenoid actuators, or driven by pressure from a separate hydraulic or pneumatic system or circuit. If there is a failure of the energy source, or a disruption of the separate pressurised circuit, actuation of the valve fails. In addition, such actuators are relatively expensive and require a number of different materials for their manufacture.

An object of the present invention is to provide a fluid flow control device with an actuator that can open or close a control valve without the aid of an independent energy source for motive power. This provides the benefits of reliability of operation, low cost, ease of installation and is also proof against vandalism or consumer tampering.

Accordingly, the present invention provides a sliding spool valve for controlling flow of a fluid transmitted between an inlet at a relatively high pressure and an outlet at a relatively low pressure, the spool valve comprising first and second opposed ends and first and second hydraulic actuators, each hydraulic actuator acting on one of the opposed ends of the sliding spool valve, wherein the spool valve is reciprocably displaced between open and closed positions by hydraulic action of the transmitted fluid selectively acting on the first and second hydraulic actuators, characterised in that each hydraulic actuator comprises a piston reciprocably slidable in a bore to pressurise a working fluid which acts on one of the opposed ends of the spool valve, means being provided for retaining the pistons of the hydraulic actuators in positions equating to the open and closed positions of the spool valve, wherein the means for retaining the pistons is operated by any of an electronic, electromagnetic or mechanical trigger.

An advantage of the spool valve of the present invention is that it derives its motive force from a mechanical advantage gained over the difference in pressure upstream and downstream of the device through a system of force intensifiers. The fluid used to drive the actuator is discharged back into the transmission conduit, downstream of the valve. A further advantage is that a compact apparatus is provided combining both valve and actuator elements.

An embodiment of the present invention will now be described with reference to the accompanying drawings, in which.

Figure 1:
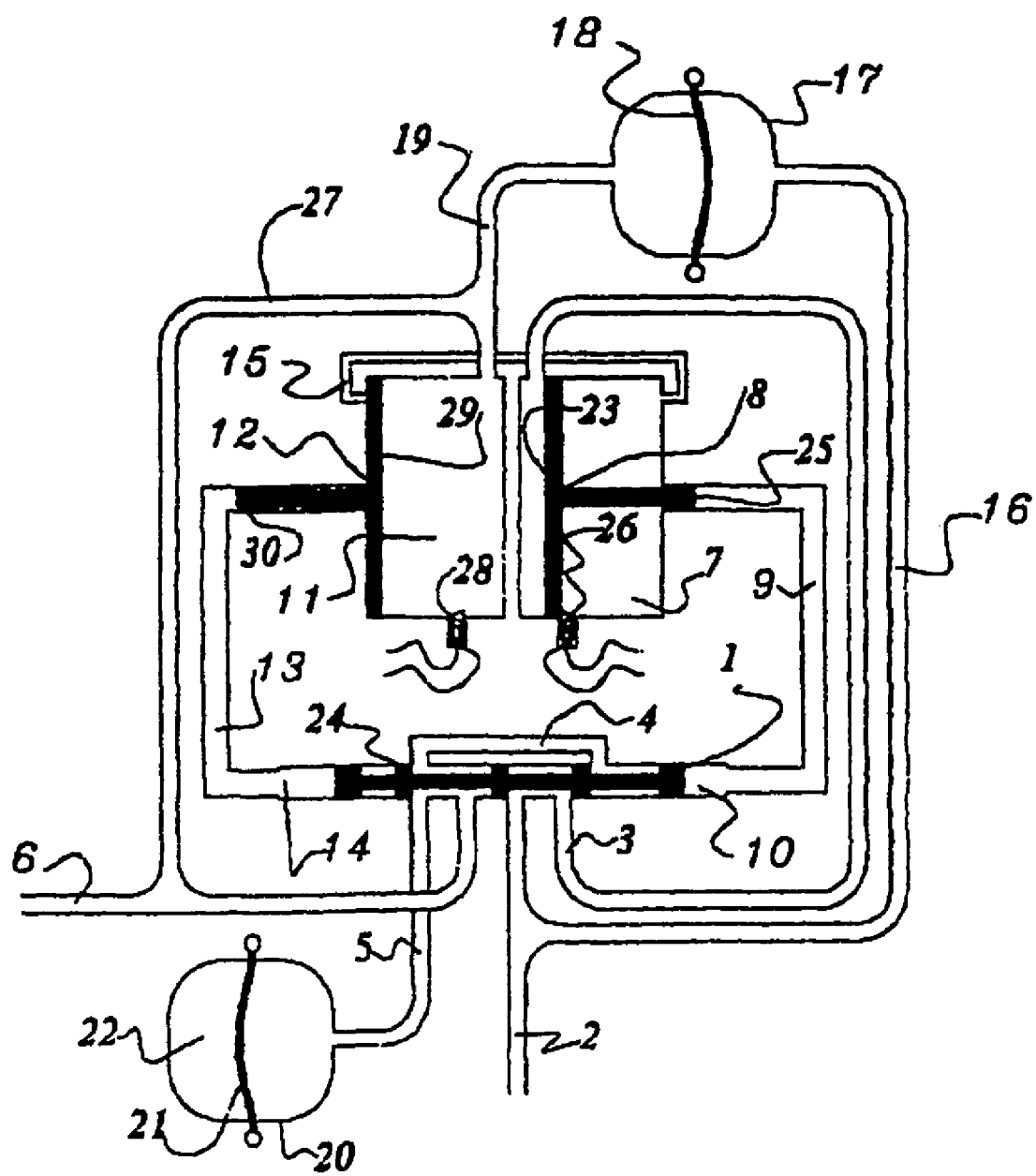
FIG. 1 is a schematic representation of a valve according to the present invention in a closed position.

The valve of the present invention, illustrated in FIG. 1, consists of a sliding spool valve 1, with first and second opposed ends, one inlet port 2, three outlet ports 3, 5, 6 and a bypass duct 4.

The upstream outlet port 3 discharges into a cylinder with three chambers, the outer chamber 7 is fitted with a piston 8 which acts as a force intensifier whose smaller end moves within a middle chamber 9 which is filled with an inert, incompressible, non-toxic fluid. The inner chamber 10 is wider and forms a force intensifier at one end of the spool valve 1. The piston 8, outer chamber 7, middle chamber 9 and inner chamber 10 together comprise a first hydraulic actuator. A trigger/lock mechanism 26 is provided in outer chamber 7 to control movement of the piston 8.

The downstream outlet port 6 also discharges into a cylinder of identical dimensions and function. The outer chamber 11 that is connected to the downstream outlet port 6 is fitted with a piston 12 which acts as a force intensifier whose smaller end moves within a middle chamber 13 that is filled with an inert, incompressible, non-toxic fluid. The inner chamber 14 is wider and forms a force intensifier at the opposite end of the spool valve 1. The piston 12, outer chamber 11, middle chamber 13 and inner chamber 14 together comprise a second hydraulic actuator. A trigger/lock mechanism 28 is provided in outer chamber 11 to control movement of the piston 12.

The outer chambers 7, 11 of the hydraulic actuators are interconnected by a pressure balancing duct 15 with the void being filled with an inert non toxic gas such as air.

The inlet port 2 is connected by a duct 16 to a pressure receiver 17, which is partitioned with a flexible and resilient diaphragm 18. The downstream end of the receiver is connected by a duct 19 to the outer chamber of the cylinder 11 and connected to the downstream outlet port 6 by a duct 27.

The intermediate outlet port 5 discharges to a pressure receiver 20 fitted with a resilient and flexible diaphragm 21. The confined space behind the diaphragm 22 is filled with an inert non-toxic gas such as air whose pressure is set at a predetermined level dependent on the characteristics of the mechanism.

The landings 24 on the spool valve 1 are arranged in such a way that it acts as a four-way three-position valve. In the closed position, the inlet port 2 is connected to the upstream outlet port 3 while the intermediate outlet port 5 is connected to the downstream outlet port 6. There is no flow of fluid through the valve. In the intermediate position all the outlet ducts 3, 5, 6 are open to each other through the bypass duct 4. There is no flow through the valve during this stage. In the open position, the inlet port 2 is connected to the downstream outlet port 6 while the intermediate outlet port 5 is open to the upstream outlet port 3. Fluid can flow through the valve.

The closed position is illustrated in FIG. 1. In this position, the face 23 of the piston with the larger surface area in the outer chamber 7 is connected to the upstream outlet port 3 is subject to the ambient pressure at the inlet port 2. The force exerted by this pressure is conveyed from the piston small end 25 through the fluid in the middle chamber 9 and inner chamber 10 to the first opposed end of the spool valve 1. The force is magnified due to the dimensions of the chambers. Upon release of the trigger/lock mechanism 26 this force creates an impulse driving the spool valve 1 to slide from the closed position through an intermediate position of the landings to an open position. In this way, the force produced by the pressure of the transmitted fluid at inlet port 2 acts to displace the spool valve 1 towards the open position. The changes of the position of the landings with respect to the ports causes flows and pressure conditions to change within the device.

Figure 2:
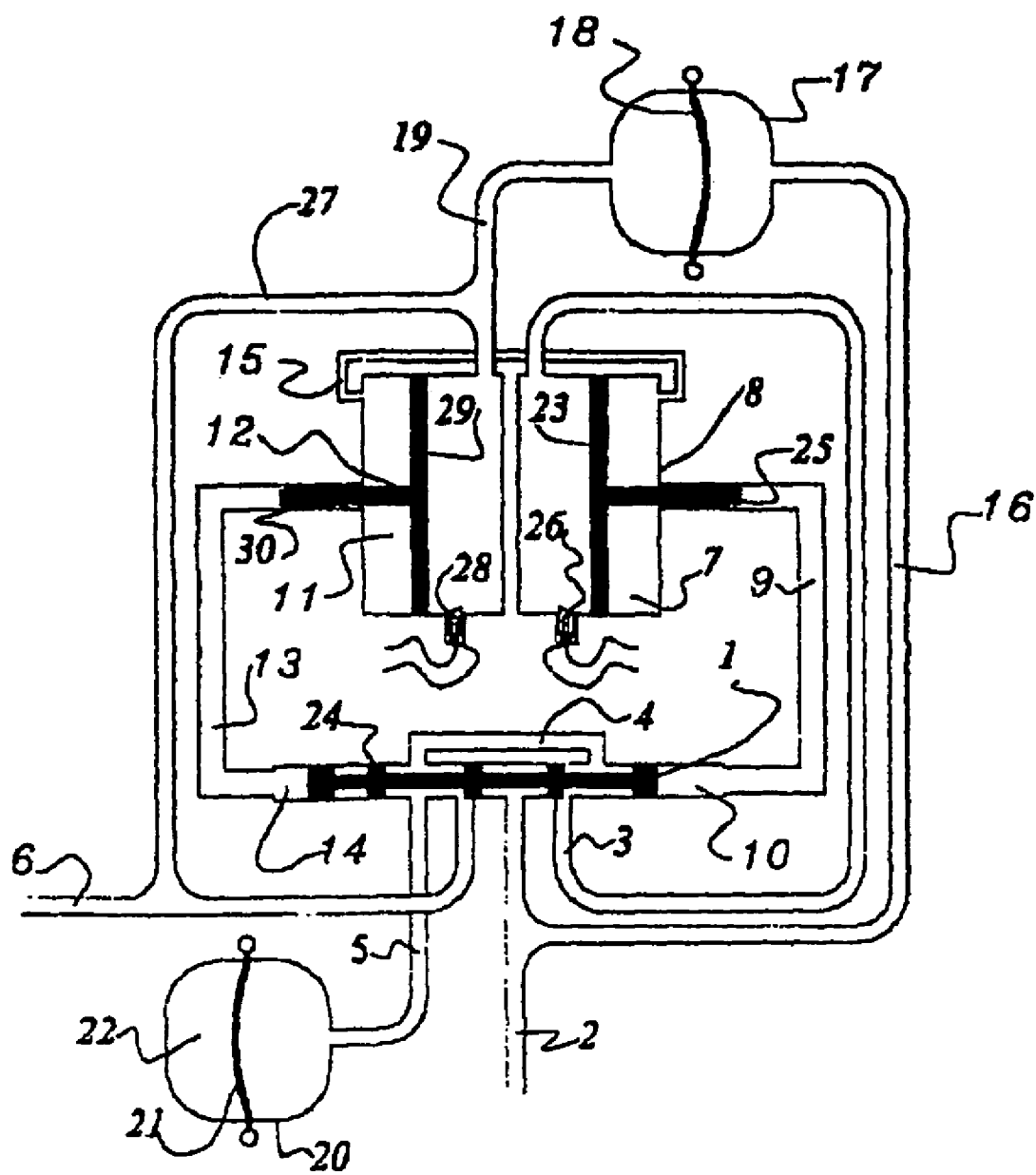
FIG. 2 is a schematic representation of the valve of FIG. 1 in an intermediate position.

The intermediate position is illustrated in FIG. 2. In this position the outlet ports 3, 4, 5 and 6 are all open to each other. As the spool valve slides from the closed position through its intermediate position to the open position, it transmits the impulsive force into the fluid of the inner chamber 14 and middle chamber 13 of the second hydraulic actuator connected to the downstream outlet port 6. This drives its piston 12 to discharge the fluid in the outer chamber 11 through the waste duct 27. This is possible where there is a difference in pressure upstream and downstream of the valve. While this takes place, pressure and fluid is compensated in the outer chamber 7 connected to the inlet port 2 by an influx of pressurised fluid from the compensating reservoir 20 moving through the intermediate outlet port 5, by-pass duct 4 and outlet port 3. When the piston 12 reaches the position where the valve is open, it is held there by a spring-loaded trigger/lock mechanism 28.

Figure 3:
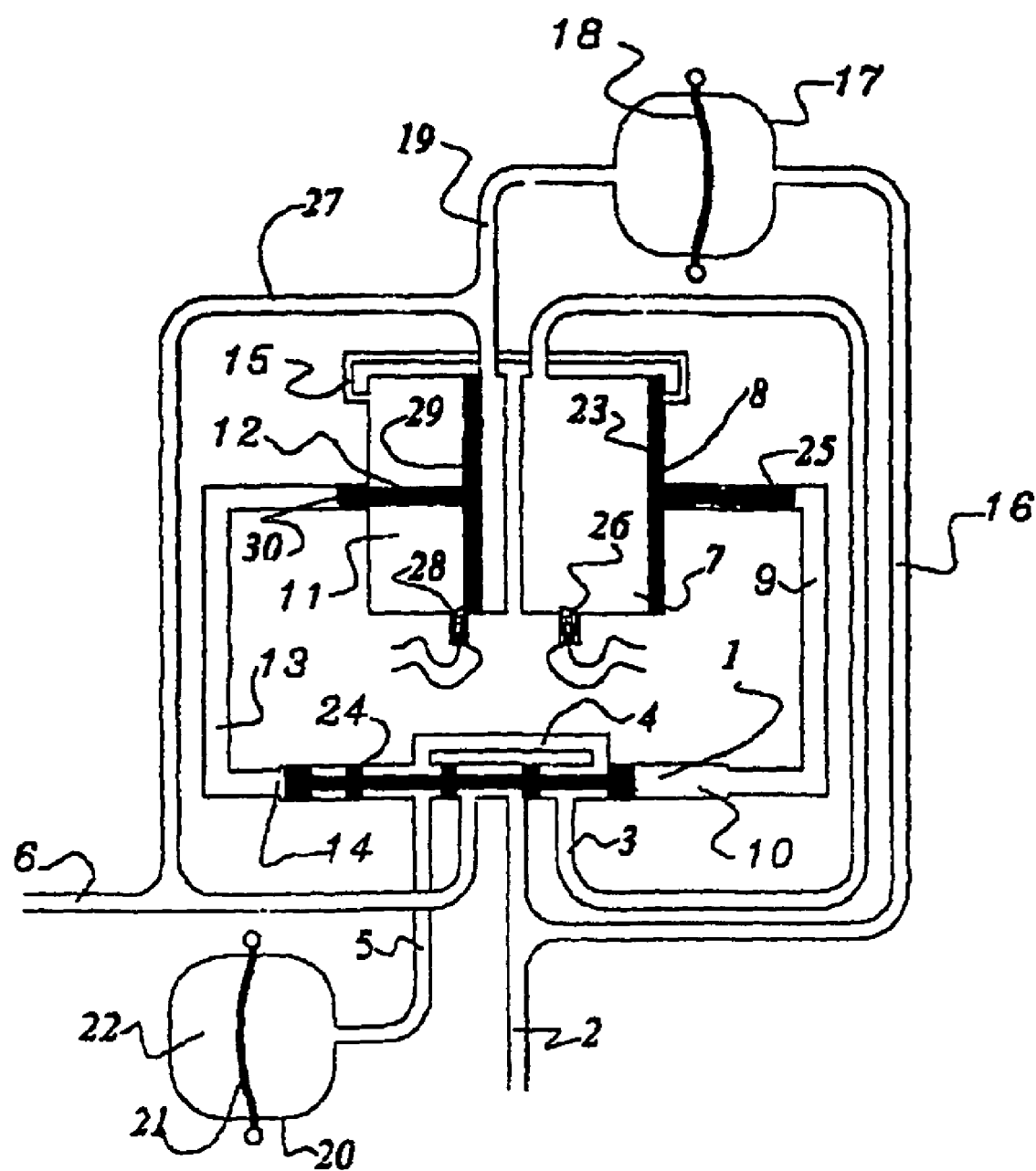
FIG. 3 is a schematic representation of the valve of FIG. 1 in an open position.

The open position is illustrated in FIG. 3. In this position, the face 29 of the piston with the larger surface area in the outer chamber 11 of the second hydraulic actuator connected to the downstream outlet pert 6 is subject to the dynamic pressure of the fluid that is passing through the valve. The force exerted by this pressure is conveyed from the smaller end of the piston 30 through the fluid in the middle camber 13 and inner chamber 14 to act on the second opposed end of the spool valve 1. The force is magnified due to the dimensions of the chambers. Upon release of the trigger/lock mechanism 28 this force creates an impulse driving the spool valve to slide from the open position through an intermediate position of the landings to the closed position. When the piston 8 reaches the position where the valve is shut, it is held there by the spring-loaded trigger/lock mechanism 26.

As the spool valve 1 slides from the open position through its intermediate position to the closed position, it transmits the impulsive force into the fluid of the inner chamber 10 and middle chamber 9 of the first hydraulic actuator connected to the inlet port 2. This drives its piston 8 to discharge the fluid in the outer chamber 7 through the upstream outlet port 3 initially into the pressure receiver 20 which accommodates the volume by distending the diaphragm 21 into the low pressure void 22. As the spool valve 1 reaches the closed position the pressure in the vessel is equalised to the downstream pressure when the intermediate outlet port 5 is opened to the downstream outlet port 6.

As the valve closes, the inlet port 2 is subject to the effects of water hammer, which will tend to momentarily increase pressure at the inlet. The pressure increase is transmitted through a duct 16, via the diaphragm 18 in the pressure vessel 17 to the outer chamber 11 of the second hydraulic actuator connected to the downstream outlet port 6 and acts to assist the piston 12 to drive the toggle 1 to the closed position. The diaphragm 18 allows the transmission of water hammer pressure while containing the flow of fluid through the system.

The valve can be used to control the flow of any fluid where there is a differential pressure upstream and downstream of the valve. It is suited to control flows of water, gas, or any other fluid that is conveyed under pressure through a large-scale distribution network. It can be fabricated from any material capable of sustaining the working pressures the valve will be subjected to such as metal or plastic. Advantageously, the valve may be manufactured from less expensive materials such as plastics and may be manufactured from one, or only a small number of, different materials.

The valve is also simply to install since connections are only required for the transmitted fluid inlet and outlet.

The spool valve 1 may be operated between the open and closed positions remotely by using an electronic, electromagnetic micro-switch or mechanical trigger to operate the trigger/lock mechanisms 26, 28. For example, a radio signal may be used to operate the trigger/lock mechanisms 26, 28 from a remote control station. Alternatively, a signal to operate the mechanisms 26, 28 may be sent electronically over telephone lines, the Internet or by satellite transmission.

Advantageously, the valve requires only minimal additional power in order to operate. Only the power required to operate the trigger/lock mechanisms 26, 28 need be supplied by an additional power source since the transmitted fluid provides the energy necessary to open and close the valve mechanism itself. This makes the valve particularly suitable for use in remote or hazardous locations where it is uneconomic or difficult to provide external power supplies. It also renders the valve less prone to tampering by the end user since the valve does not depend on a major external power source, such as an electric power outlet, which may be tampered with by the user. For example, the trigger/lock mechanisms may be powered from a self-contained battery which is inaccessible to the user.

The valve can also be made to generate electricity for storage in a rapid discharging capacitor and used to power the trigger/lock mechanisms 26, 28. This can be achieved by providing a magnet in the casing of the outer chambers 7, 11 and a conductive coil in the pistons 8, 12. When the pistons move to and fro due to the pressure of the transmitted fluid and the working of the spool valve an electrical current will be generated. This can be stored in the capacitor to power the trigger/locking mechanisms making the valve completely self contained and self sustaining.

What is claimed is:

1. A sliding spool valve for controlling flow of a fluid transmitted between an inlet at a relatively high pressure and an outlet at a relatively low pressure, the spool valve comprising first and second opposed ends and first and second hydraulic actuators, each hydraulic actuator acting on one of the opposed ends of the sliding spool valve, wherein the spool valve is reciprocally displaced between open and closed positions by hydraulic action of the transmitted fluid selectively acting on the first and second hydraulic actuators, characterized in that each hydraulic actuator comprises a piston reciprocally slidable in a bore to pressurize a working fluid which acts on one of the opposed ends of the spool valve, a lock mechanism being provided for retaining the pistons of the hydraulic actuators in positions equating to the open and closed positions of the spool valve, wherein the lock mechanism for retaining the pistons is operated by any of an electronic, electro-magnetic or mechanical trigger.

2. A sliding spool valve as claimed in claim 1, wherein each hydraulic actuator has a first end with a larger surface area and a second end with a smaller surface area, the pressure of the transmitted fluid selectively acting on the first end of each hydraulic actuator and the second end of each hydraulic actuator acting on one of the oppposed ends of the spool valve.

3. A sliding spool valve as claimed in claim 1, wherein the trigger is operated remotely.

4. A sliding spool valve as claimed in claim 1, wherein the trigger is powered by an internal power source.

5. A sliding spool valve as claimed in claim 1, wherein the trigger is powered by an electrical capacitor.

6. A sliding spool valve as claimed in claim 5, wherein the capacitor is charged by movement of a coil on at least one of the pistons with respect to a magnet.

7. A sliding spool valve as claimed in claim 1, wherein the spool valve is an open-centre spool valve.

8. A sliding spool valve as claimed in claim 7, wherein the spool valve is a three-position, four-way valve.

9. A sliding spool valve as claimed in claim 8, further comprising an inlet port connected to the inlet, a first outlet port communicating with the first end of the first hydraulic actuator, a second outlet port communicating with the first end of the second hydraulic actuator and the outlet, wherein in the closed position of the spool valve the inlet port and the first outlet port are in pressure and fluid communication and the inlet port and the second outlet port are not in fluid communication such that fluid and pressure is not transmitted between the inlet and outlet, and in the open position the inlet port and the second outlet port are in fluid communication such that fluid is transmitted between the inlet and outlet, and wherein in the closed position the spool valve is biased towards the open position by the first hydraulic actuator, and in the open position the spool valve is biased towards the closed position by the second hydraulic actuator.

10. A sliding spool valve as claimed in claim 9, further comprising a third outlet port communicating with a pressure receiver.

11. A sliding spool valve as claimed in claim 9, further comprising a by-pass duct, wherein in an intermediate position of the spool valve between the open and closed positions, the first outlet port, second outlet port and third outlet port are in mutual fluid communication.

12. A sliding spool valve as claimed in claim 9, wherein a pressure vessel is provided in fluid communication with the inlet port to transmit a water hammer pressure increase to the second hydraulic actuator as the spool valve closes.

13. A sliding spool valve as claimed in claim 1, wherein the transmitted fluid is any of water, oil, or natural gas.

14. A sliding spool valve as claimed in claim 1, wherein the sliding spool valve is made substantially from plastic.

15. A sliding spool valve as claimed in claim 1, wherein the sliding spool valve is made substantially from metal.

* * * * *